Patented Sept. 30, 1952

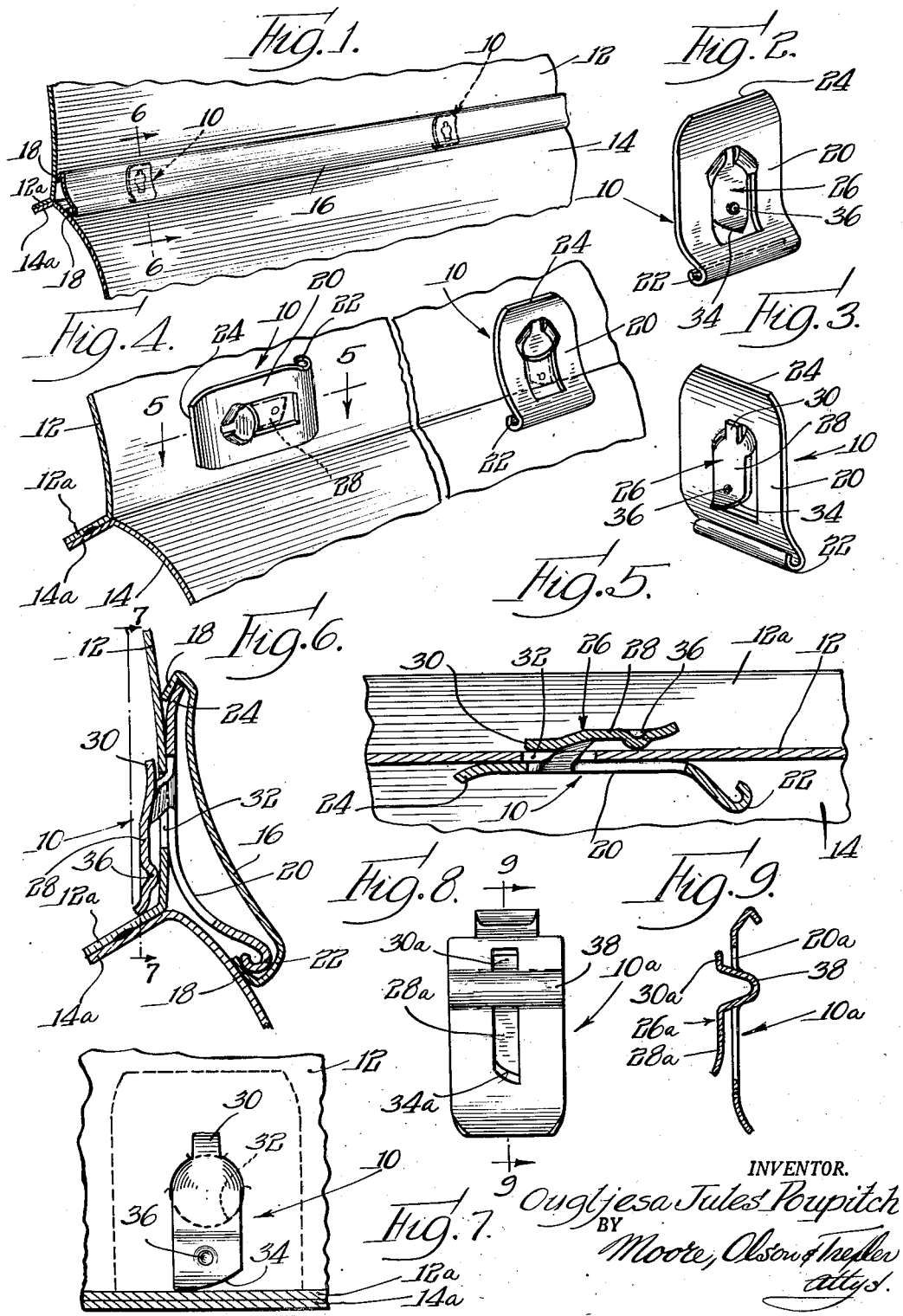

2,612,245

UNITED STATES PATENT OFFICE 2,612,245

FASTENING DEVICE

Ougljesa Jules Poupitch, Chicago, Ill., assignor to Illinois Tool Works, Chicago, Ill., a corporation of Illinois Application December 28, 1948, Serial No. 67,623

5 Claims. (Cl. 189—88)

This invention relates generally to fastening devices or clips having a latching portion thereof adapted for initial insertion within and subsequent rotation with respect to an aperture in a work piece, and an oppositely disposed portion or plate providing a supporting means.

Various forms of fastening devices as, for example, clips for securing moulding strips in place, have heretofore been used and many of such devices are designed to be snapped into position within a work aperture. In other words, a number of these prior devices employ a shank which is adapted to be inserted longitudinally so as to automatically snap the fastener into interlocking association in a work sheet. There are applications requiring fastening devices which are not snapped into position, but which must provide a positive interlock between the fastener and the work. The present invention is concerned primarily with the provision of a simple and economical fastener or clip which may be inserted within a work aperture and subsequently rotated so as to provide a positive interlock between the fastener and the work and at the same time provide means for supporting another work structure as, for example, a strip of moulding stock.

More specifically, the present invention contemplates a fastener of the type referred to above which may be stamped and formed from sheet material such as sheet metal, one portion of the fastener providing a latch adapted to overlie or extend beyond opposite margins of a work aperture, and another portion or head designed to resiliently bear against the opposite side of a work piece, said head also serving where necessary as an auxiliary work support member.

A further object of the present invention is to provide a fastener of the type mentioned, in which one margin of the insertable latching member is designed for camming engagement with a lateral extension of the apertured work part so as to insure positive overlapping of the work surface by a portion of the latching member oppositely disposed from said cam margin.

Still more specifically, the present invention contemplates a fastening member or clip having the cam part just mentioned, wherein a resilient head portion or plate oppositely disposed from the latching member is designed for resilient clamping engagement with the work surface.

It is another object of the present invention to provide the simple yet strong fastener previously mentioned which is designed to accommodate applications necessitating the use of a moulding strip or the like in the vicinity of the juncture of two angularly disposed work surfaces, and to this end the invention contemplates a fastener which may be rotated in order to latch it in place, said rotational operation serving automatically to place the portion of the fastener under stress in overlying relation with respect to the area of juncture of the work surfaces.

It is a further object of the present invention to provide a rotary type clip or fastener designed for camming engagement with a lateral work extension and having a resilient head portion as referred to above equipped with oppositely disposed margins for receiving inwardly extending flanges of a moulding strip or the like.

The foregoing and other objects and advantages will be more apparent from the following detailed description, when considered in connection with the accompanying drawing, wherein—

Fig. 1 is a fragmentary perspective view of a pair of angularly disposed work pieces having a moulding strip secured in overlying relationship to the juncture of said work pieces by fastening members or clips embodying the features of the present invention;

Fig. 2 is a perspective view of one of the clips of Fig. 1 detached from the work parts;

Fig. 3 is likewise a perspective view of the fastener or clip as seen from the rear of the device shown in Fig. 2;

Fig. 4 is an enlarged perspective view similar to Fig. 1 with the moulding strip removed so as more clearly to illustrate the functional and structural characteristics of the fasteners, the fastener at the left being shown in the position which it occupies upon initial insertion within the work aperture, and the fastener at the right being shown in the position which it assumes when it is rotated 90° from the position illustrated by the fastener at the left;

Fig. 5 is an enlarged transverse sectional view being taken substantially along the line 5—5 of Fig. 4;

Fig. 6 is an enlarged vertical sectional view taken substantially along the line 6—6 of Fig. 1;

Fig. 7 is a fragmentary elevational view taken substantially along the line 7—7 of Fig. 6;

Fig. 8 is an elevational view of a fastener or clip of slightly modified form, wherein the fastener body or head is bowed to lend resilience; and Fig. 9 is a transverse sectional view taken substantially along the line 9—9 of Fig. 8.

Referring now to the drawing wherein like numerals have been employed to designate similar parts throughout the various figures, it will be seen that one embodiment of the fastening device or clip contemplated by the present invention is designated generally by the numeral 10 in Figs. 1 to 7, inclusive. In Fig. 1 two of the clips 10 are shown applied to a pair of angularly disposed work pieces 12 and 14. The work piece 12 has a lateral extension 12a which is secured as by welding to a complementary flange 14a of the work piece 14. A moulding strip 16 having inturned flanges 18 is held in position by the fasteners 10, and in this position the moulding strip 16 superimposes the line of juncture of the work pieces 12 and 14.

The clip 10 includes a body portion or head 20 which in the particular embodiment may be stamped conveniently from sheet metal or the like. The lower margin of the head or plate 20 is bent out of the plane of said plate and is provided with a rolled margin or bead 22. The opposite margin of the plate or head 20 is also bent slightly out of the plane thereof to provide a lip 24. The material from the center of the plate 20 is struck out to provide a latching member 26. This latching member 26 consists of an elongated portion or arm 28 extending in substantial parallelism with and spaced from the head 20. The upper or opposite extremity of the latching member 26 is formed with a struck out lug 30 which is positioned in a plane substantially coincident with the plane of the longer arm 28. The lug 30, being struck from the material of the latching member 26, leaves a double strap support between the latching member and the head and this strap arrangement extends through the work piece aperture 32 to lend stabilizing support to the fastener when it is in mounted position. The amount of space between the plane of the plate 20 and arm 28 will depend upon the thickness of the work piece with which the fastener is to be employed.

In initially applying the fastener 10 to the work piece 12, the arm 28 is inserted within a complementary aperture 32 of the work piece 12, as clearly illustrated in Fig. 5. It will also be seen that during this initial insertion the fastener body or plate 20 assumes the position shown at the left of Fig. 4. By first inserting the arm 28 through the aperture 32 and shifting the fastener sufficiently to the right, Fig. 5, so as to effect clearance of the lug 30 with respect to the margin of the aperture 32, the entire latching member 26 may be positioned to one side of the work piece 12, as shown. If the fastener 10 is now rotated in a clockwise direction, a cam-like edge or margin 34 at the free extremity of the arm 28 is brought into engagement with the upper surface of the lateral extension 12a of the work piece 12, see Figs. 6 and 7. As the fastener continues to rotate, the cam edge 34 forces the lug 30 into overlying or overlapping relationship with respect to the material of the work piece oppositely disposed from that portion of the work piece which is superimposed by the arm 28. In other words, the cam action is such as to shift the fastener upwardly, as illustrated in Figs. 4 and 6, thereby assuring positive latching of the arm 28 and the lug 30 against the inner surface of the work piece 12.

It will also be noted that in the disclosed embodiment, rotation of the fastener as just described not only results in the camming engagement of the extremity of the latch arm 28 with a lateral work extension 12a, but the free rolled margin 22 of the plate 12 is moved into engagement with the outer surface of the work piece 14. This causes the plate or head 20 to be sprung or stressed, thereby causing resilient clamping engagement of the opposite margins of the plate 20 with the complementary surfaces of the work pieces 12 and 14. With the view of reducing frictional resistance to turning, the arm 28 in the vicinity of the cam edge 34 is provided with a dimple 36. This reduces to a minimum the area of contact between the arm 28 and the inner surface of the work piece 12, and hence contributes to the ease with which the fastener may be rotatably applied in position.

After a suitable number of fasteners 10 have been applied in the manner described above, the moulding strip 16 may then be attached by bringing the upper flange 18 of the moulding strip into overlying and overlocking association with the lip 24, Fig. 6. This lip 24 is relatively rigid and will not yield to any appreciable extent as the opposite moulding strip flange 18 is sprung over the bead or rolled margin 22. Thus the opposite margins of the head or plate 20 function to clampingly hold the opposed margins of the moulding strip firmly in position.

In Figs. 8 and 9 a slightly modified form of clip designated generally by the numeral 10a is disclosed. This clip differs primarily from the clip 10 in that the head or plate portion 20a is provided with bends 38 to give added resiliency in instances where this is found essential. The presence of the bends 38 makes it possible for the plate 20a to elongate a sufficient amount to more readily accommodate itself to the work surfaces. It will also be noted that the opposite margins of the plate 20a are of slightly modified cross-sectional shape. The clip 10a is provided with the latching portion 26a made up of an arm 28a and a lug 30a.

It has been found that in certain instances rotation of the fastener described herein is not necessary in order to secure the fastener in position. It has been ascertained, for example, that the fastener may be initially inserted while occupying the position illustrated at the right side of Fig. 4. After this initial insertion, a hammer blow may be applied to the upper lip 24, thereby suddenly urging the fastener downwardly. This enables the arm 28, Fig. 6, to be shifted sufficiently with respect to the aperture 32 so as to cause the lug 30 to clear the upper portion of the fastener. The resiliency of the fastener head is such as to urge the lug 30 inwardly (to the left, Fig. 6) thereby automatically locating the fastener in position to accommodate the moulding strip 16.

From the foregoing it will be apparent that the present invention contemplates an improved rotary type fastening device which may be produced by practicing conventional stamping and forming methods, and also which may be produced from flat sheet stock, such as sheet metal. The device herein described particularly lends itself for use in securing work pieces, such as molding strips, in place. The device is also particularly adaptable in instances where the work piece, such as metallic trim, is required to overly the juncture of two work surfaces. In such instances a portion of the head of the device is flexed as an incident to fastener rotation, and the material of the fastener under stress provides a very firm, yet resilient, lock. The camming action resulting from the engagement of the edge of one of the arms with a laterally extending work surface insures a positive interlock of the fastener with the apertured work piece.

While for purposes of illustration, certain specific structural features have been disclosed herein, it should be understood that other modifications and changes are in contemplation, and that the invention should only be limited by the scope of the claims appended hereto.

The invention is hereby claimed as follows:

1. A rotary type fastening device including a work engaging plate-like head, an integral latching member struck from within the periphery of said head and including an arm and a complementary opposed lug insertable within a work aperture for contacting a work surface in the vicinity of said aperture oppositely disposed from the surface engageable by said plate-like head, and cam means at the extremity of said arm which is adapted as an incident to rotation experienced by the fastener to cause shifting of the fastener along the plane of the work surface and thereby insure latching association of the lug with the work piece.

2. A rotary type fastening device including a work engaging plate-like head, an integral latching member spaced from the plane of said head including an arm and a complementary opposed lug insertable within a work aperture for contacting a work surface in the vicinity of said aperture oppositely disposed from the surface engageable by said plate-like head, and cam means at the extremity of said arm which is adapted as an incident to rotation experienced by the fastener to cause shifting of the fastener along the plane of the work surface and thereby insure latching association of the lug with the work piece, a marginal portion of said plate-like head being laterally flexible and the opposite marginal portion being relatively rigid.

3. A rotary type fastening device including a work engaging plate-like head, an integral latching member spaced from the plane of said head including an arm and a complementary opposed lug insertable within a work aperture for contacting a work surface in the vicinity of said aperture oppositely disposed from the surface engageable by said plate-like head, cam means at the extremity of said arm which is adapted as an incident to rotation experienced by the fastener to cause shifting of the fastener along the plane of the work surface and thereby insure latching association of the lug with the work piece, and means extending laterally from said latching member for making limited area contact with a work piece whereby to reduce frictional resistance to rotation of the fastener.

4. In combination with work pieces, one of which is apertured, said work pieces having angularly disposed surface areas meeting along a common line of juncture, a rotary fastening device including a work engaging plate-like head for superimposing said line of juncture, an integral latching member spaced from the plane of said head including an arm and a complementary opposed lug extending within an aperture in one of said work pieces and contacting the work surface in the vicinity of said aperture, said latching member bearing against one side of said apertured work piece and having a cam edge engaging the angularly disposed portion of said work piece, said plate-like head bearing against the opposite side of said work piece, said plate-like head being flexed and having its free margin positioned adjacent the work surface disposed angularly with respect to said apertured work piece, and another work piece overlying and held in position by opposite margins of said plate-like head.

5. In combination with work pieces, one of which is apertured, said work pieces having angularly disposed surface areas meeting along a common line of juncture, and a fastening device including a work engaging plate-like head for overlying the line of juncture, at least one portion of the head being laterally yieldable as an incident to the engagement thereof with one of said angularly disposed work surfaces, an integral latching member spaced from the plane of said head including an arm and a complementary opposed lug extending within an aperture of one of said work pieces and superimposing the work surface in the vicinity of said aperture, said latching member having its lug bearing against one side of said work piece and its arm bearing against the angularly disposed portion of said work piece, said plate-like head bearing against the opposite side of said work piece, said plate-like head being flexed laterally and having its free margin positioned against the work surface disposed angularly with respect to said apertured work piece, the opposed margins of said plate-like head providing means for interlocking with a work piece to be supported in superimposing relation with respect to said common line of juncture.

OUGLJESA JULES POUPITCH.

REFERENCES CITED

The following references are of record in the file of this patent:

UNITED STATES PATENTS

| Number | Name | Date |
| --- | --- | --- |
| 2,195,068 | Wiley | Mar. 26, 1940 |
| 2,217,574 | Tinnerman | Oct. 8, 1940 |
| 2,251,644 | Tinnerman | Aug. 5, 1941 |
| 2,258,555 | Kost | Oct. 7, 1941 |
| 2,305,122 | Wiley | Dec. 15, 1942 |
| 2,318,840 | Del Camp | May 11, 1943 |
| 2,346,712 | Tinnerman | Apr. 18, 1944 |